(12) United States Patent
Chakraborty et al.

(10) Patent No.: US 10,140,690 B2
(45) Date of Patent: Nov. 27, 2018

(54) SYSTEM AND METHOD FOR IMAGE PRESENTATION BY A VEHICLE DRIVER ASSIST MODULE

(71) Applicant: Harman International Industries, Incorporated, Stamford, CT (US)

(72) Inventors: Pranjal Chakraborty, Bangalore (IN); Rajesh Biswal, Bangalore (IN); Debashis Mukherjee, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/424,252

(22) Filed: Feb. 3, 2017

(65) Prior Publication Data

US 2018/0225808 A1    Aug. 9, 2018

(51) Int. Cl.
*G06K 9/40* (2006.01)
*G06T 5/00* (2006.01)
(Continued)

(52) U.S. Cl.
CPC .............. *G06T 5/003* (2013.01); *B60K 35/00* (2013.01); *B60R 1/00* (2013.01); *G02B 27/0172* (2013.01); *G06T 11/60* (2013.01); *H04N 7/183* (2013.01); *B60K 2350/106* (2013.01); *B60K 2350/2013* (2013.01); *B60K 2350/2052* (2013.01);
(Continued)

(58) Field of Classification Search
None
See application file for complete search history.

(56) References Cited

U.S. PATENT DOCUMENTS 7,643,659 B2 * 1/2010 Cao .................... G06K 9/00234
382/115
7,986,856 B2 * 7/2011 Chiang ................. H04N 5/243
358/521

(Continued)

OTHER PUBLICATIONS

Zhang, Haichao, Yanning Zhang, and Thomas S. Huang. "Efficient sparse representation based image super resolution via dual dictionary learning." Multimedia and Expo (ICME), 2011 IEEE International Conference on. IEEE, 2011.*

(Continued)

*Primary Examiner* — Andrae S Allison
(74) *Attorney, Agent, or Firm* — Gordon & Rees, LLP (57) ABSTRACT

The present disclosure relates to systems, devices and methods for image presentation for vehicle driver assistance. In one embodiment, a method includes receiving image data representing an outside of a vehicle and enhancing the image data. Image enhancement can include inverting the image data, running a dehazing operation based on scene radiance, medium transmission and atmospheric light of the image data. The method may also include generating reconstructed image data from the enhanced image data by performing a sparse representation of the enhanced image data for denoising of the enhanced image data, and performing a learning operation to identify and enhance objects of interest in the enhanced image data with the sparse representation. The method also includes outputting the reconstructed image data to a display unit of the vehicle. Vehicle driver assist systems and devices are provided to enhance image data detected by vehicle cameras and wearable devices.

20 Claims, 8 Drawing Sheets

(51) Int. Cl.
*G06T 11/60* (2006.01)
*H04N 7/18* (2006.01)
*B60K 35/00* (2006.01)
*B60R 1/00* (2006.01)
*G02B 27/01* (2006.01)

(52) U.S. Cl.
CPC ... *B60K 2350/352* (2013.01); *B60R 2300/205* (2013.01); *B60R 2300/207* (2013.01); *B60R 2300/307* (2013.01); *B60R 2300/8033* (2013.01); *B60R 2300/8093* (2013.01); *G02B 2027/014* (2013.01); *G02B 2027/0141* (2013.01); *G02B 2027/0178* (2013.01); *G06T 2207/10016* (2013.01); *G06T 2207/20081* (2013.01); *G06T 2207/20084* (2013.01); *G06T 2207/20221* (2013.01); *G06T 2207/30252* (2013.01)

(56) References Cited

U.S. PATENT DOCUMENTS

| | | | | |
|---|---|---|---|---|
| 8,059,913 B2* | 11/2011 | Kwon | | G06T 5/40 345/617 |
| 8,184,924 B2* | 5/2012 | Tsuruoka | | H04N 1/4072 348/207.99 |
| 8,401,280 B2* | 3/2013 | Lim | | G06K 9/00 382/154 |
| 8,582,915 B2* | 11/2013 | Wen | | H04N 19/51 382/261 |
| 2010/0259651 A1* | 10/2010 | Fattal | | G06T 5/003 348/241 |
| 2011/0043603 A1* | 2/2011 | Schechner | | G06T 5/50 348/25 |
| 2011/0188775 A1* | 8/2011 | Sun | | G06K 9/40 382/274 |
| 2014/0072216 A1* | 3/2014 | Fang | | G06T 5/009 382/167 |
| 2014/0205192 A1* | 7/2014 | Wang | | G06T 5/00 382/167 |
| 2016/0238701 A1* | 8/2016 | Oh | | G10K 11/18 |

OTHER PUBLICATIONS

Zhang et al, Enhancement and Noise Reduction of Very Low Light Level Images, 21st International Conference on Pattern Recognition (ICPR 2012), Nov. 11-15, 2012. Tsukuba, Japan.*
Ramponi et al, Nonlinear unsharp masking methods for image contrast enhancement, Journal of Electronic Imaging 5(3), 353-366 (Jul. 1996).*
Hussain et al, Visibility Enhancement of Scene Images Degraded by Foggy Weather Conditions with Deep Neural Networks, Hindawi Publishing Corporation Journal of Sensors, vol. 2016, Article ID 3894832, 9 pages.*

* cited by examiner

SYSTEM AND METHOD FOR IMAGE PRESENTATION BY A VEHICLE DRIVER ASSIST MODULE

FIELD

The present disclosure relates to electronic devices and applications, and more particularly to processes and configurations for image presentation by a vehicle driver assist module.

BACKGROUND

Safe operation of a vehicle is a primary concern for many vehicle operators. As such, technical developments have been directed to systems focused on accident prevention and safe operation. Advances in technology have led to assistance systems that provide alerts and supplement a vehicle operators field of view. For example, some conventional vehicle systems employ sensors and cameras for accident avoidance and for other vehicle assist functions. Some existing systems provide a lighted indication of vehicles in close proximity. Others include active braking technology. Despite the development of such systems there exists a need and a desire for driver assist during low and/or diminished visibility situations.

Vehicle operation can be more difficult due to lighting conditions and weather. For low light and night time driving, objects within a vehicles path can be difficult to detect even with the use of headlights. Ambient lighting conditions and directed light sources from other vehicles can also impair an operators vision. Lighting conditions due to sunlight can also reduce or impair visibility due to high exposure (e.g., glare) to light during day time driving. In addition to lighting conditions, weather conditions, atmospheric particles and moisture can also impair visibility. Optical imaging devices (e.g., cameras, etc.) and conventional driver assist systems may not provide adequate information due to lighting conditions, weather and other environmental features.

Some conventional approaches utilize infrared (IR) cameras to assist with identification of objects, especially in low light scenarios. However, these systems may have difficulty identifying certain types of objects depending on ambient temperature. During use in high temperature environments, IR sensors may be ineffective. In addition, IR systems may not provide enough detail or consistent output to identify objects of interest. In addition, because IR systems are typically designed for night vision, IR systems are not designed to improve visibility in different lighting and environment conditions. IR systems are also expensive and their use may be cost prohibitive for certain applications.

There exists a desire for driver assist systems to improve visibility during low light conditions, such as twilight or a night, especially on stretches of roads that are not well lit.

BRIEF SUMMARY OF THE EMBODIMENTS

Disclosed and claimed herein are methods, devices and systems for image presentation by a vehicle driver assist module. One embodiment is directed to a method including receiving, by a driver assist module, image data representing an outside of a vehicle. The method also includes inverting, by the driver assist module, the image data to form inverted image data and running, by the driver assist module, a dehazing operation on inverted image data to generate enhanced inverted image data of the outside of the vehicle, wherein the dehazing operation is based on scene radiance, medium transmission and atmospheric light of the image data. The method also includes inverting, by the driver assist module, the enhanced inverted image data to generate enhanced image data. The method also includes generating, by the driver assist module, reconstructed image data from the enhanced image data, wherein the reconstructed image data is generated by performing a sparse representation of the enhanced image data for denoising of the enhanced image data, and performing a learning operation to identify and enhance objects of interest in the enhanced image data with the sparse representation. The method also includes outputting, by the driver assist module, the reconstructed image data to a display unit of the vehicle.

In one embodiment, the image data representing the outside of the vehicle includes video data captured by a front facing camera of the vehicle.

In one embodiment, the image data representing the outside of the vehicle includes video data captured by a wearable device associated with an operator of the vehicle.

In one embodiment, inverting includes pixel-wise inversion of entire frames of the image data.

In one embodiment, the dehazing operation includes determining scene radiance for the inverted image data based on an adjustment parameter to the medium transmission.

In one embodiment, the sparse representation of the enhanced image data utilizes existing, or infers, a combination of basic elements for frames of the image data forming a dictionary of atoms to change noise level for basic elements of the frame.

In one embodiment, performing a learning operation to identify and enhance objects of interest in the enhanced image data with the sparse representation includes identification of objects in frames, comparison and adjustment of objects in frames, and selection of one or more objects to identify in frames of the image data.

In one embodiment, the sparse representation and learning operations are performed based on comparison of a daylight image associated with the image data using position of the vehicle.

In one embodiment, generating reconstructed image data based on the enhanced image data includes stitching denoised image data from the sparse representation with objects identified by the learning module.

In one embodiment, outputting the reconstructed image data includes superimposing outline elements associated with objects identified for the reconstructed image data.

Another embodiment is directed to a vehicle driver assist module including an input module to receive image data representing an outside of a vehicle, an output module, and an image enhancer module. The image enhancer module includes a processor configured to invert the image data to form inverted image data and run a dehazing operation on inverted image data to generate enhanced inverted image data of the outside of the vehicle, wherein the dehazing operation is based on scene radiance, medium transmission and atmospheric light of the image data. The processor is also configured to invert the enhanced inverted image data to generate enhanced image data. The processor is also configured to generate reconstructed image data from the enhanced image data, wherein the reconstructed image data is generated by performing a sparse representation of the enhanced image data for denoising of the enhanced image data, and performing a learning operation to identify and enhance objects of interest in the enhanced image data with the sparse representation. The processor is also configured to control the output module to output the reconstructed image data to a display unit of the vehicle.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure is directed to processes for image presentation by a vehicle driver assist module. In one embodiment, a method for image presentation by a vehicle driver assist module includes inversion of image data, image dehazing and reconstruction of image data for display. Processes described herein may be applied to non-IR optical image devices (e.g., digital cameras, etc.) presenting image and video content. The processes may provide an ordered series of functions performed by vehicle hardware to enhance detection and improve operation of a vehicle assist system and devices. Processes described herein may be directed to low visibility conditions as a result of one or more of low-light, directed light (e.g., high beams, etc.), glare and weather conditions (e.g., haze, fog, high temperature, etc.). Processes described herein may be employed by device and system configurations and can include the use of learning algorithms to generate sparse representations of image data (e.g., dictionary learning) and deep learning algorithms.

Another embodiment is directed to a vehicle system that may be deployed to provide driver assistance. In one embodiment, systems may employ front facing imaging devices to capture video image data outside of a vehicle. The system may also be configured to utilize image data captured by a wearable device. Image handling and processing by the device may be output to one or more displays including but not limited to vehicle infotainment displays and/or heads up displays for an operator of the vehicle.

Another embodiment is directed to an image enhancement module. The device may be configured to perform one or more image enhancement functions. The image enhancement module, as well as the processes and systems described herein, may employ location data and previously detected daylight images for enhancement of imagery during low light conditions.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

Figure 1:
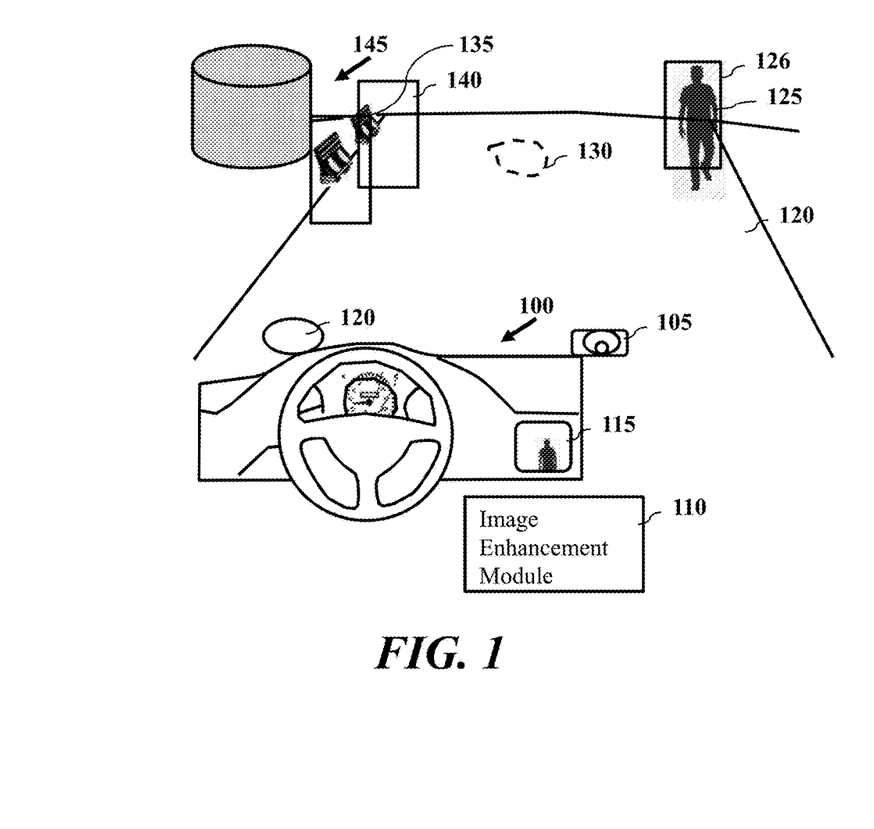
FIG. 1 depicts a graphical representation of a system according to one or more embodiments.

Referring now to the figures, FIG. 1 depicts a graphical representation of a system according to one or more embodiments. In one embodiment, system 100 is a driver assist system for a vehicle. System 100 includes camera 105, image enhancement module 110 and display 115. In certain embodiments, system 100 may include a heads up display 120.

According to one embodiment, camera 105 captures video image data outside of a vehicle, such as in a front area of a vehicle, associated with roadway 120. Image enhancement module 110 is configured to enhance image data captured by camera 105 and present an image output for display in the vehicle on display 115 or with heads up display 120. According to one embodiment, camera 105 relates to a digital camera configured to optically detect and capture image data. Exemplary frame detection rates of camera 105 may be one or more frame detection rates, including but not limited to 60 Hz, 120 Hz, 240 Hz, etc. In other embodiments, system 100 may receive image content from a wearable device (not shown in FIG. 1). Image enhancement module 110 is configured to enhance image data detected by one or more cameras, such as camera 105. According to one embodiment, image enhancement module 110 may be configured for enhancement of image data for one or more of low-light, directed light (e.g., high beams, etc.), glare and weather conditions (e.g., haze, fog, high temperature, etc.). Image enhancement module 110 may be configured to detect objects and present graphical elements to indicate detected objects to an operator of the vehicle.

According to one embodiment, display 115 is configured present enhanced image data. Display 115 may be part of a vehicle infotainment system. Display 120 may relate to a heads up display and may present one or more of image data, object indicators and representations of a scene detected by camera 105.

According to one embodiment, system 100 may be configured to detect and identify fixed and non-fixed (e.g., moving, non-permanent, etc.) objects. FIG. 1 illustrates person 125 with a graphical representation of an exemplary identifier 126. Identifier 126 relates to a rectangular outline presented as an overlay to the position of person 125. According to one embodiment, image enhancement module 110 may add one or more identifiers to enhanced image for presentation by display 115. Roadway may include one or more hazards, such as hazard 130 that may be detected and identified by the driver assist system. Hazards detected by image enhancement module 110 may include pot holes, speed bumps, medians, etc.

According to one embodiment, image enhancement module 110 may be configured to detect fixed objects generally shown as 135 and can present an identifier shown as 140. Certain large items, such as structure 145, may also be detected and/or indicated by image enhancement module 110. In FIG. 1, rectangular shapes are depicted as indicators, however, it should be appreciated that one or more of shading, coloring, highlighting, and display of graphical images may be employed as indicators.

Figure 2:
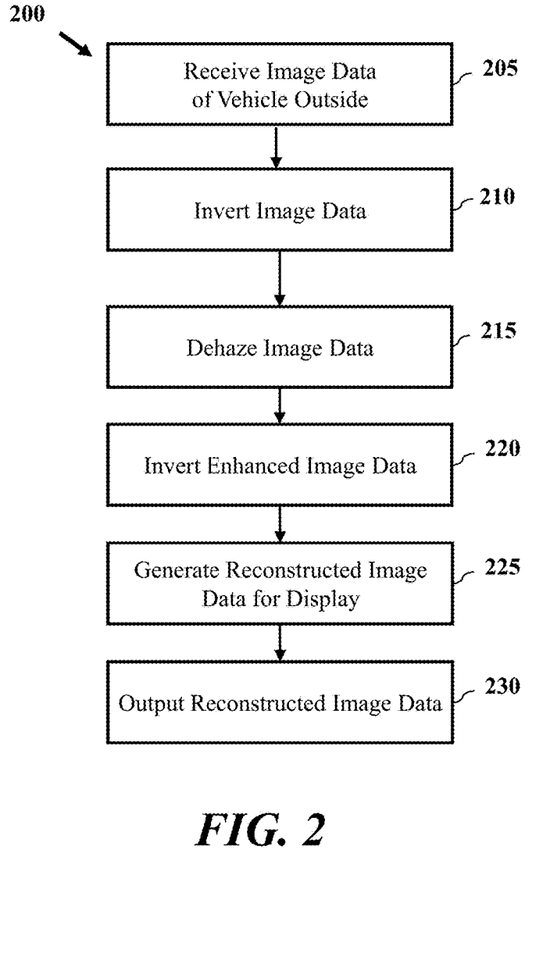
FIG. 2 depicts a process for image enhancement according to one or more embodiments.

FIG. 2 depicts a process for image enhancement according to one or more embodiments. Process 200 may be employed by a device, such as an image enhancement module (e.g., image enhancement module 110) of a vehicle driver assist system (e.g., system 100) and one or more other components to present indications of objects. According to one embodiment, process 200 may be initiated by the image enhancement module of the driver assist system receiving image data representing an outside of a vehicle at block 205. Image data received at block 205 may relate to video data captured by a front facing camera of the vehicle. The image enhancement module may characterize selected frames or all frames of received image data for detection of objects. Process 200 may be directed to a single frame or multiple frames of the received image data. In some embodiments, multiple frames may be processed concurrently to provide a real time display of detected objects. In certain embodiments, image data received at block 205 includes video data captured by a wearable device associated with an operator of the vehicle.

At block 210, received image data is inverted to form inverted image data. In one embodiment, inverting at block 210 includes pixel-wise inversion of entire frames of the image data. Inversion at block 210 and used herein relates to a color inversion of image frames, such that colors of image frames are inverted. By way of example, white pixels are inverted to become black, and black pixels of the frame are inverted to become white, etc. According to one embodiment, image data is inverted to better detect dark objects or surfaces.

At block 215, the image enhancement module performs a dehazing operation on the inverted image data to generate enhanced inverted image data of the outside of the vehicle. The dehazing operation at block 215 is based on scene radiance, medium transmission and atmospheric light of the image data. The dehazing operation includes determining scene radiance for the inverted video data based on an adjustment parameter to the medium transmission. Based on dehazing at block 210, scene radiance can be recovered despite one or more of a low visibility condition and effect of temperature on objects.

At block 220 the driver assist module inverts the enhanced inverted image data to generate enhanced image data. At block 225, reconstructed image data is generated from the enhanced image data. According to one embodiment, reconstructed image data includes performing a sparse representation of the enhanced image data for denoising of the enhanced image data and performing a learning operation to identify and enhance objects of interest in the enhanced image data with the sparse representation. In one embodiment, the sparse representation of the enhanced image data utilizes existing, or infers, a combination of basic elements for frames of the image data forming a dictionary of atoms to change noise level for basic elements of the frame. The learning operation is performed to identify and enhance objects of interest in the enhanced image data with the sparse representation. The learning operation includes identification of objects in frames, comparison and adjustment of objects in frames, and selection of one or more objects to identify in frames of the image data. The sparse representation and learning operations are performed based on comparison of daylight images associated with the image data using position of the vehicle. Generating reconstructed image data at block 225 based on the enhanced image data may include stitching denoised image data from the sparse representation with objects identified by the learning module.

At block 230, the driver assist module outputs the reconstructed image data to a display unit of the vehicle. Outputting the reconstructed image data includes super imposing outline elements associated with objects identified for the reconstructed image data. Elements of process 200 may be employed by driver assist systems and image enhancement modules.

Figure 3:
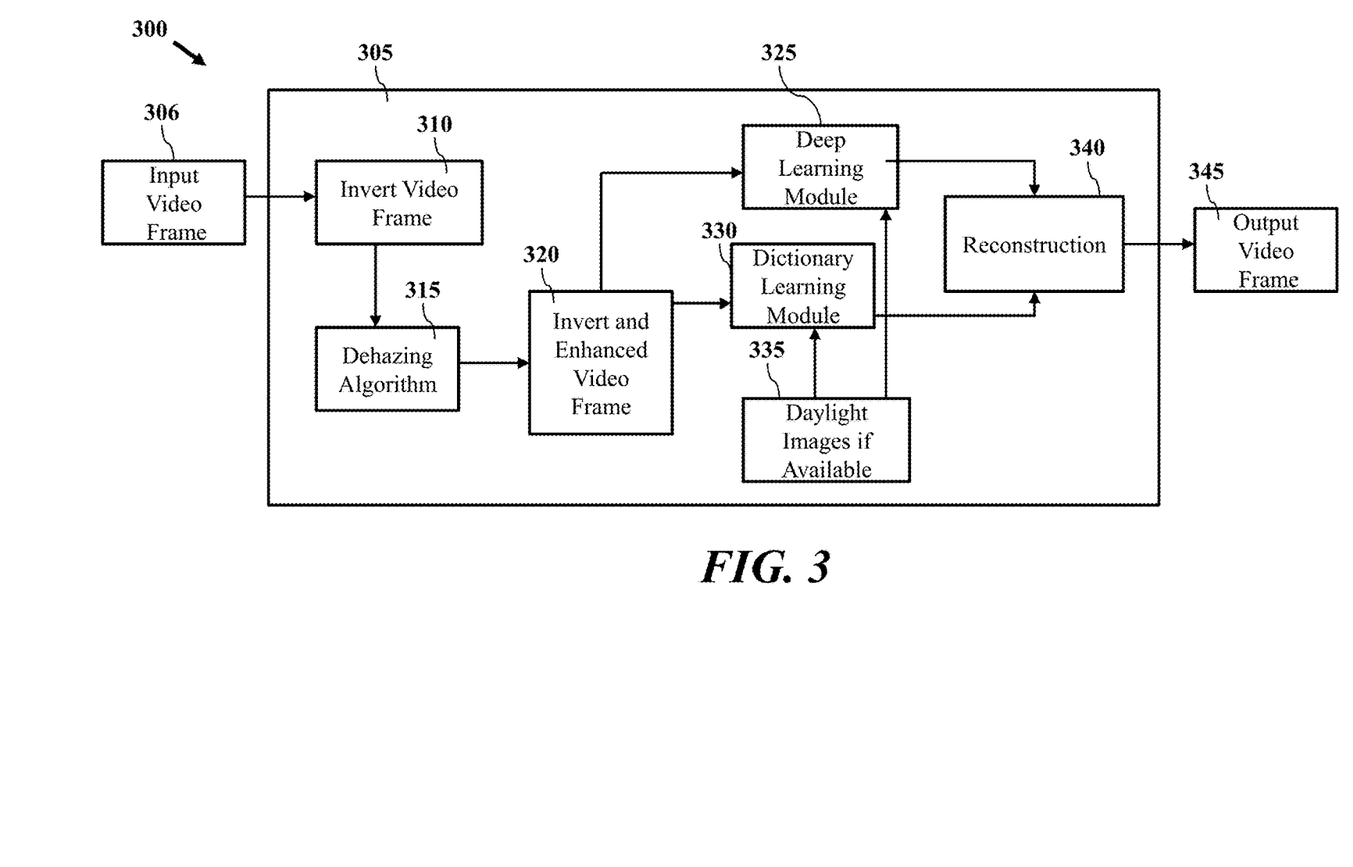
FIG. 3 depicts a diagram of an image enhancer according to one or more embodiments.

FIG. 3 depicts a diagram of an image enhancement operation according to one or more embodiments. Image enhancement functions 300 may be included in a vehicle to detect and notify operators of objects in low visibility situations. Features and operations of FIG. 3 may be employed to drastically improve the quality image data collected by a vehicle camera sensor. According to one embodiment, an image enhancement module 305 receives input video frames from input 306. Enhanced image data may output using output 345.

According to one embodiment, image enhancement module 305 inverts a received video frame at block 310. Video frame inversion at 310 can include inverting the pixels of video frame. According to one embodiment, inversion relates to a color inversion, such as white to black and black to white. For a color input image I(x) (x is each pixel), the pixel-wise inversion can be calculated as:

$$I(X)^c = 255 - I(X)$$

Inverted image data may then be enhanced by dehazing at block 315. According to one embodiment, dehazing block 315 is based on dark channel prior to enhance low lighting videos and high dynamic range videos according to the following:

$$J^{inv}(x) = (I^{inv}(x) - A)/t(x) + A$$

where $J^{inv}(x)$ is the scene radiance, $t(x)$ is the medium transmission, A is the global atmospheric light: $t(x) = 1.0 - w\, dark(x)$, and w is a parameter to adjust the value of $t(x)$. According to one embodiment, w may be adaptive and can be calculated based on the light intensity of the pixel regions within the image. This can be used to not only enhance the image with low light, but can be used to reduce high beam glare from oncoming traffic.

Dehazed image data is then inverted and enhanced into video frame at block 320. In one embodiment, the inversion at block 320 can be achieved according to the following:

$$J(X)=255-J^{inv}(x)$$

Deep learning module 325 works in conjunction with dictionary learning module 330 for reconstruction at block 340. According to one embodiment, deep learning module 325 identifies objects of interest and enhances objects. In one embodiment, object identification by deep learning module 325 uses one or more learning algorithms (e.g., deep learning modules) to find objects of interests, like pedestrians/animals, potholes/bumps, road signs, road side curbs, etc., in the field of view of a vehicle camera or wearable device imagery. The object is identified even if it is partially visible because of low light or occlusion. Deep learning module 325 enhances objects of interest based on frame comparison. Once an object is identified, further deep learning algorithms are used for enhancing the object of interest. The object and/or graphical elements may then be superimposed on the original image data. Object enhancement may include prior knowledge of static objects (road signs, potholes, etc.) from available daytime images of the same location.

Dictionary learning module 330 is configured to perform representation learning of image data. In one embodiment, dictionary learning module 330 performs sparse dictionary learning to determine a sparse representation of the input data (also known as coding) in the form of a linear combination of basic elements as well as those basis elements themselves. The basic elements identified by dictionary learning module 330 may be characterized as atoms that make up the dictionary. Dictionary learning module 330 can also use existing images of the GPS coordinate (and heading) to come up with a dictionary for detected image data. By way of example, daylight images 335 may be provided if available. In certain embodiments, denoising of image frames may be performed using a clustering algorithm (e.g., KSVD clustering, etc.) when existing images are not available.

According to one embodiment, daylight images 335 relate to image data captured during when visibility is not reduced based on the location of the vehicle (e.g., GPS data, direction of travel). Daylight images 335 may be employed by deep learning module 325 and dictionary learning module 330.

Reconstruction module 340 receives the output of deep learning module 325 and dictionary learning module 330. Reconstruction module 340 reconstructs denoised image data from dictionary learning module 330 by stitching objects from deep learning module 325. The reconstructed image data is then output as video frame 345 to provide in real-time to the driver.

Figure 4:
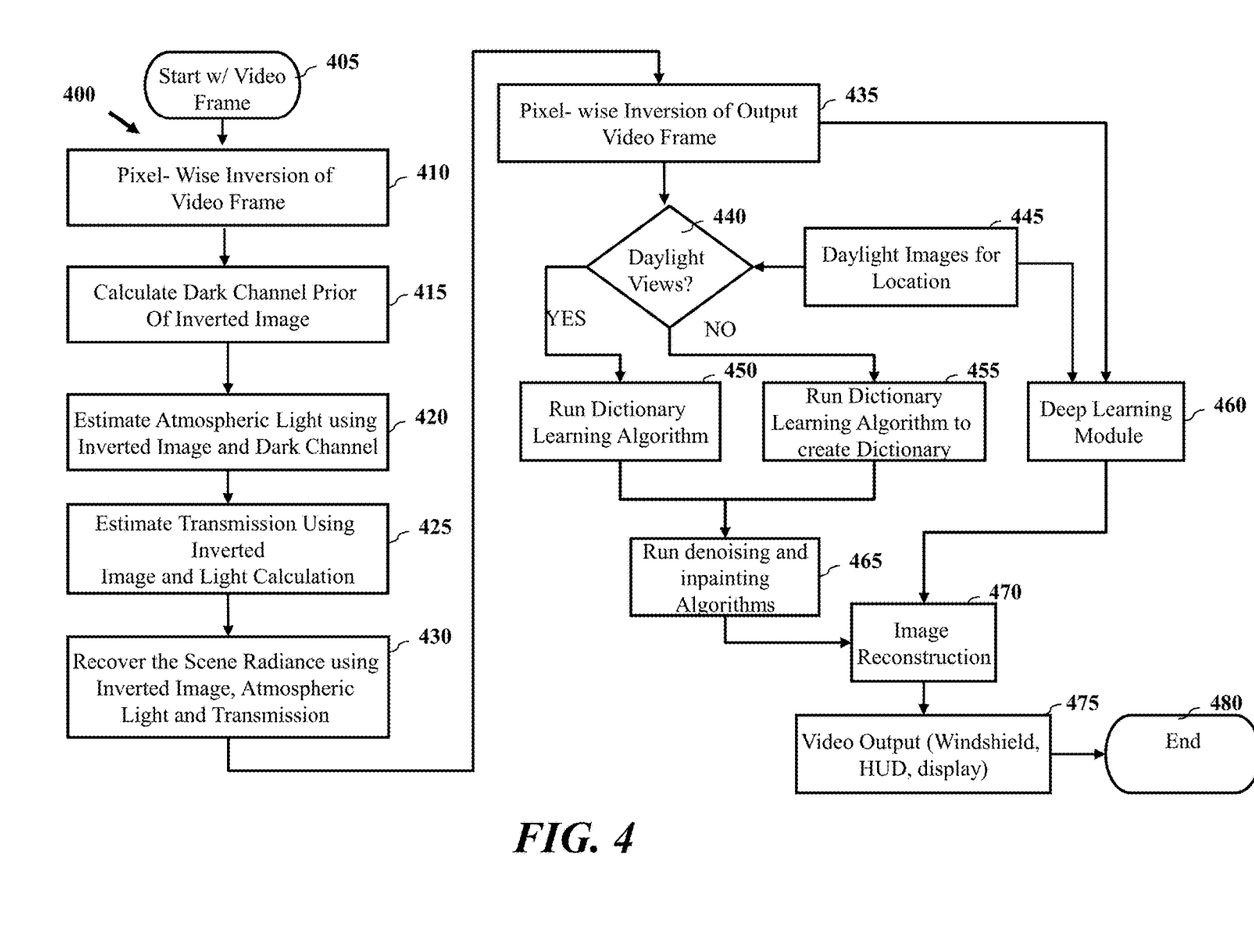
FIG. 4 depicts graphical representation of an image enhancement process according to one or more embodiments.

FIG. 4 depicts graphical representation of an image enhancement process according to one or more embodiments. According to one embodiment, process 400 may by employed by an image enhancement module of a driver assist system. Process 400 may be initiated based on one or more video frames at block 405. The image data is then inverted by pixel-wise inversion at block 410. Inversion of the image data may be performed based on pixel color and/or monochromatic inversion. At block 415, dark channel prior is calculated for the inverted image. Atmospheric light is then estimated using the inverted image and dark channel at block 420. Light transmissibility for the detected image is estimated using the inverted image and light calculation at block 425.

At block 430, process 400 continues with recovering the scene radiance using inverted image, estimated atmospheric light and transmission. At block 435, recovered image is then inverted by pixel-wise inversion. Image data recovered at block 435 relates to an enhanced image with respect to removal and or correction of one or more effects of atmospheric light, transmission and dehazing. Process 400 may then enhance the image further by performing dictionary learning operations and deep learning of the image content.

At decision block 440, process 400 determines if daylight views are available. Daylight images for a location of the vehicle may be obtained at block 445. In certain embodiments, a vehicle communication can request daylight images for locations based on communication with a network. In other embodiments, daylight images may be stored for particular routes. When daylight images are available (e.g., "YES" path out of decision block 440), a dictionary learning algorithm is run at block 450. When daylight images are not available (e.g., "NO" path out of decision block 440), a dictionary learning algorithm is run at block 455 to create a dictionary. Process 400 also includes running one or more denoising and in-painting algorithms at block 465 which will generate enhanced image data based on the dictionary learning.

A deep learning module receives image data from block 435 at block 460 and identifies objects in the image data. In certain embodiments, the deep learning module can also receive daylight images for a location of from block 445. At block 470, process 400 reconstructs image data from the dictionary learning and deep learning enhancements. Enhanced video data may then by output by a vehicle display such as a windshield display, heads up display (HUD), or display in general at block 475 and process ends at block 480.

Figure 5:
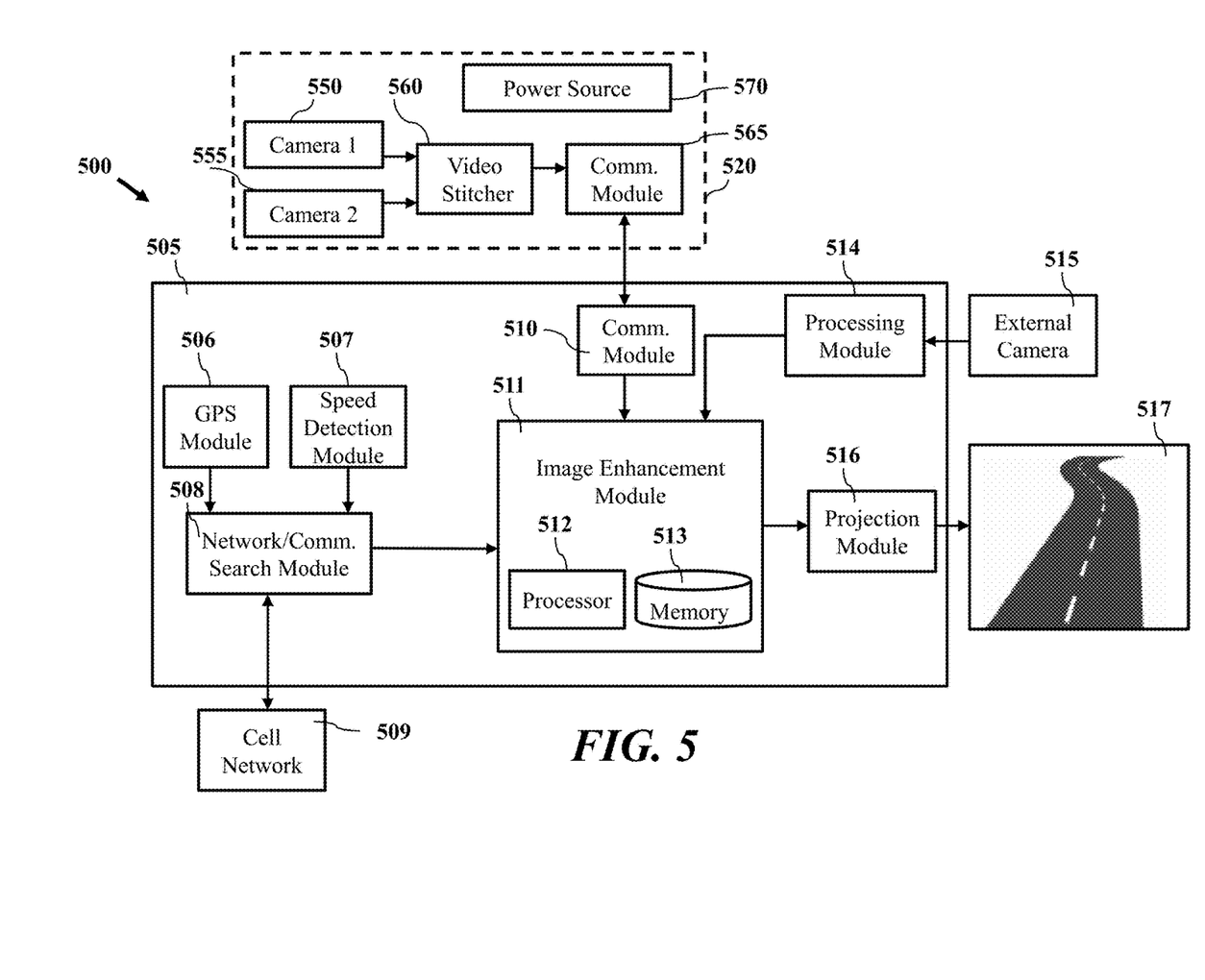
FIG. 5 depicts a system diagram according to one or more other embodiments.

FIG. 5 depicts a system diagram according to one or more other embodiments. System 500 may be configured to display enhanced image data according to one or more embodiments. System 500 may include a driver assist system 505 and external camera 515. External camera 515 relates to an external front facing camera. In certain embodiments, system 500 may include a peripheral device for detection of image data. When system 500 includes secondary device 520, external camera 515 may be employed when the battery level of the secondary device 520 is not able to drive inbuilt cameras, user preference for front facing camera, or when depth perception of an object is requested, external camera 515 can be used with cameras of secondary device 520.

Driver assist system 505 may be part of infotainment system of a vehicle and can include GPS module 506 for obtaining positioning and heading data of a vehicle and speed detection module 507 to determine vehicle speed. GPS module 506 enables vehicle positioning data to be received by driver assist system 505. Speed detection module 507 detects the speed of the vehicle and passes speed information to secondary device 520 via communication unit 510.

Network/Communication search module 508 receives GPS information to search daylight views of the same positions. Dictionary learning and deep learning modules of image enhancement module 511 utilize daylight images for view reconstruction when available. Network/Communication search module 508 can receive position and speed data to be used for enhancement of collected image data. In addition, Network/Communication search module 508 can obtain data from an external network, such as cellular network 509.

Communication module 510 is configured to receive image data from one or more secondary devices, such as device 520. Image enhancement module 511 includes a processor 512 and memory 513. Processing module 514 may be configured to receive and process image data from external camera 515. By way of example, processing module 514 may store and provide frames to image enhancement module 511. Processing module 514 may process the front view camera video and send to secondary system 520 by way of communication module 510.

Projection module 516 is configured to output enhanced image data to display 517. Display 517 is configured to present image data captured by an external camera 515 or secondary device 520.

According to one embodiment, system 500 optionally includes secondary device 520. Secondary device 520 may be a wearable device, such as smart eyewear system. Secondary device 520 includes cameras 550, 555 (e.g., camera 1, camera 2) configured to detect image data relative to the view of a vehicle operator. Video stitcher 560 combines the two views from cameras 550, 555 to create a combined view. This combined view can replicate a vehicle operator's view. Cameras 550, 555 can be used to determine depth from detected images. Communication module 565 enables data transfer from secondary device 520 to driver assist system 505. Secondary device 520 can also include a power source 570.

Figure 6:
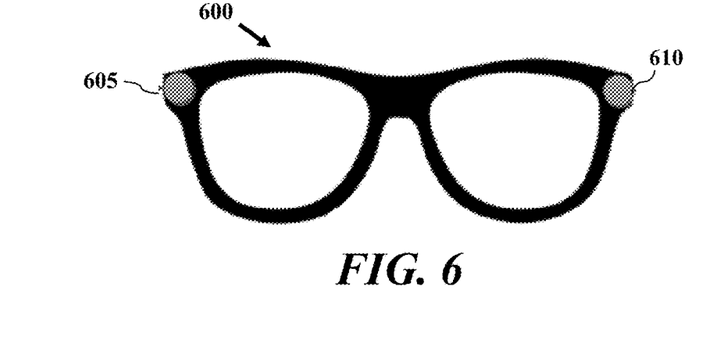
FIG. 6 depicts a graphical representation of a wearable unit according to one or more embodiments.

FIG. 6 depicts a graphical representation of a secondary device according to one or more embodiments. Secondary device 600 (e.g., secondary device 520) relates to a wearable image detector that provides real-time video image data. Secondary device 600 includes cameras 605 and 610 mounted to an eyewear frame to capture a vehicle operators view. In certain embodiments, cameras 605 and 610 are capable of up to 30 fps (frames per second). Secondary device 600 can include a communications module configured for wireless communication (e.g., WiFi, etc.) to enable data transfer to a vehicle unit (e.g., infotainment system). Cameras 605 and 610 can provide real time video capture.

Figure 7:
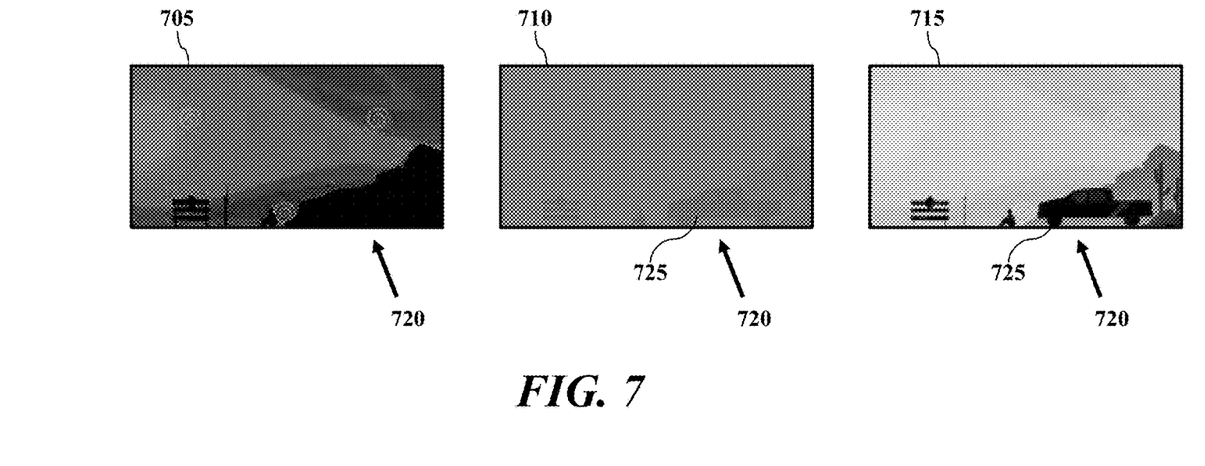
FIG. 7 depicts a graphical representation of image data according to one or more embodiments.

FIG. 7 depicts a graphical representation of image data according to one or more embodiments. According to one embodiment, an image enhancement device and processes described herein are discussed with respect to frames. It should be appreciated that the processes and devices described herein operate using many frames of the video image to create enhanced image data presented as a collection of enhanced frames. FIG. 7 depicts an exemplary visual description of image enhancement. Image 705 relates to image data detected by a camera during low visibility. Image 705 may include area 720 with low visual detail that appears dark or with a little pixel variation. According to the processes and devices described herein, image 705 may be enhanced by one or more of dehazing and denoising. Enhanced image data in response to denoising may be provided to a deep learning module to detect objects.

Image 710 represents deep learning object detection, wherein object 725 is identified in area 720. Object 725 may be detected based on one or more inferences for series of images. Based on detected objects and enhanced images, image 715 may be presented wherein the content of the image as a whole is improved and denoised. In addition objects detected in the frame, such as object 725, are included in the image data.

Figure 8:
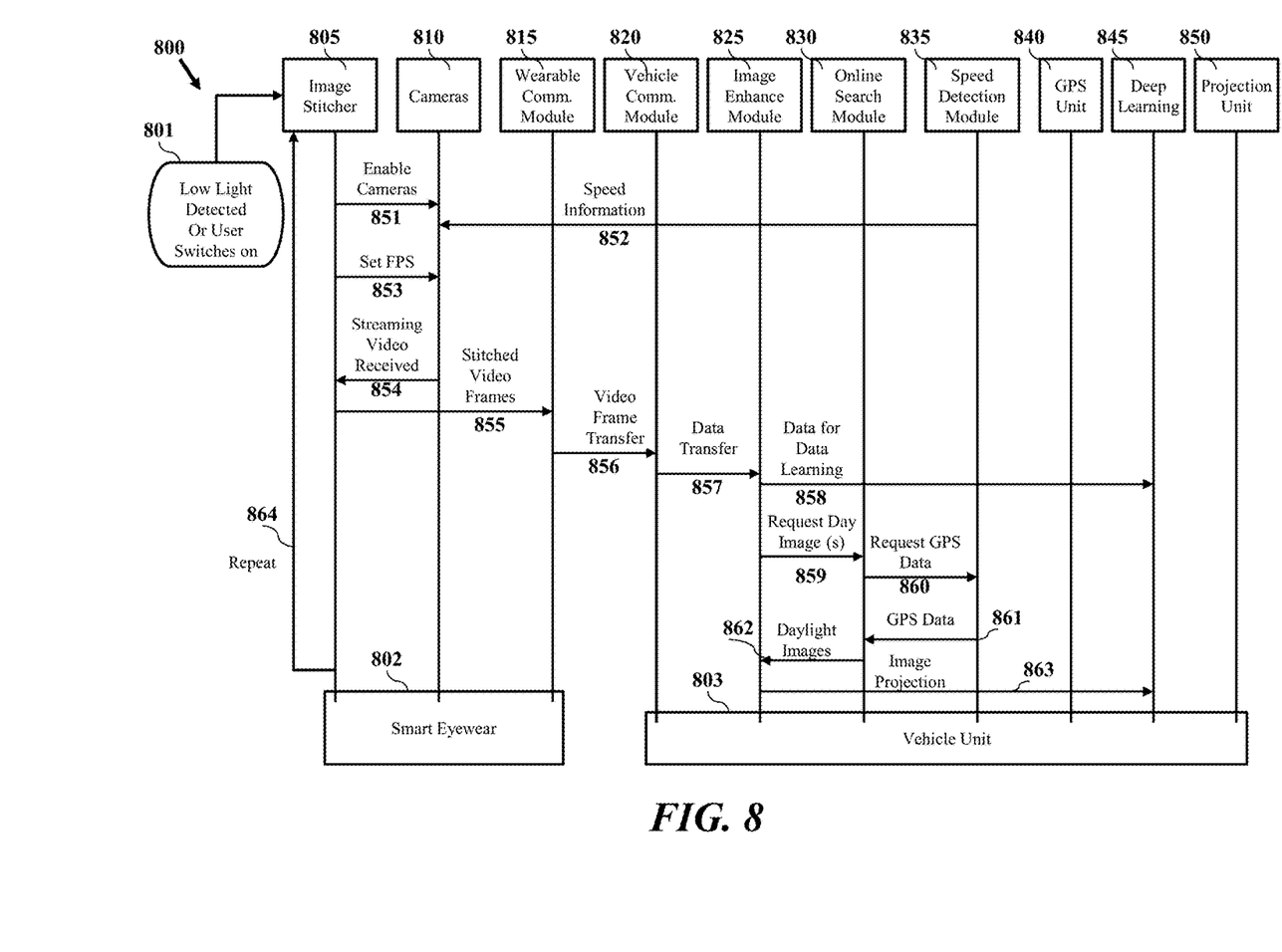
FIG. 8 depicts a flow diagram of low-light image enhancement according to one or more embodiments.

FIG. 8 depicts a flow diagram of low light image enhancement according to one or more embodiments. Process 800 relates to operation of a vehicle unit including a wearable device, such as smart eyewear 802, and a vehicle unit 803 including an image enhancement unit. Smart eyewear 802 includes image stitcher element 805, cameras 810 and wearable communication module 815. Vehicle unit 803 includes vehicle communication module 820, image enhancement module 825, online search module 830, speed detection module 835, GPS unit 840, deep learning module 845 and projection unit 850.

Process 800 relates to an exemplary flow for communication and operation of smart eyewear 802 and a vehicle unit 803. Process 800 may be initiated by a low light detection at block 801. In response, image stitcher 805 enables cameras 810 shown as 851. Speed detection module 835 provides vehicle speed information to cameras 810 shown as 852. Image stitcher 805 then sets the frame rate (e.g., frames per second) of the cameras 810, shown as 853. Cameras 810 provide a video stream to image stitcher 805, shown as 854. Image stitcher 805 provides stitched video frames to the wearable communication module 815, shown as 855.

Wearable communication module 815 transfers video to communication module 820 shown as 856, which then transfers the data to image enhancement module 825, shown as 857. Process 800 continues with image enhancement module 825 providing image data to deep learning module 845, shown as 858.

A dictionary module of image enhancement module 825 requests day images shown as 859. Online search module 830 requests for GPS data from speed detection module 835, shown as 860. GPS data is returned to online search module 830, shown as 861. In turn daylight images are provided to image enhancement module 825 shown as 862. Image enhancement module 825 then projects enhanced image data to projection unit 850, shown as 863.

Figure 9:
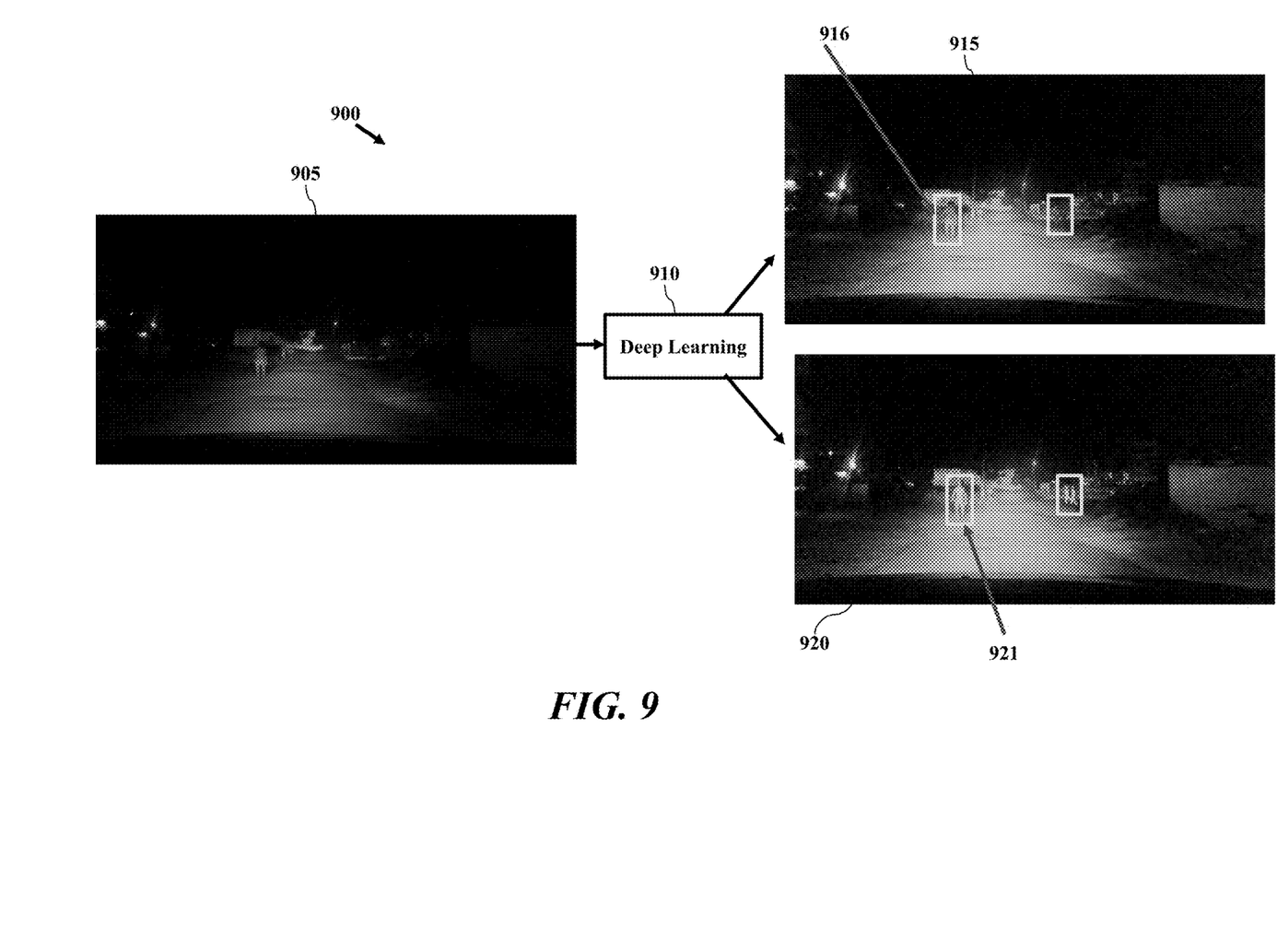
FIG. 9 depicts a graphical representation of deep learning according to one or more embodiments.

FIG. 9 depicts a graphical representation of deep learning according to one or more embodiments. Process 900 is a graphical representation of a deep learning process according to one or more embodiments. According to one embodiment, input image 905 is provided to deep learning module 910. The deep learning module is configured to perform one or more operations on input image 905 to output enhanced images with identification of objects of interest. In one embodiment, deep learning module 910 outputs image 915 which relates to an output enhanced image with an object of interest 916 highlighted. According to another embodiment, deep learning module 910 outputs image 920 which relates to an output enhanced image with an object of interest 921 highlighted and colorized. As shown in FIG. 9, images 915 and 920 include increased brightness compared to image 905 that is based on more than just a brightness setting of a display. One or more enhancement processes described herein may be employed to improve captured image data for display and/or presenting a display of objects detected by a camera of the vehicle.

Figure 10:
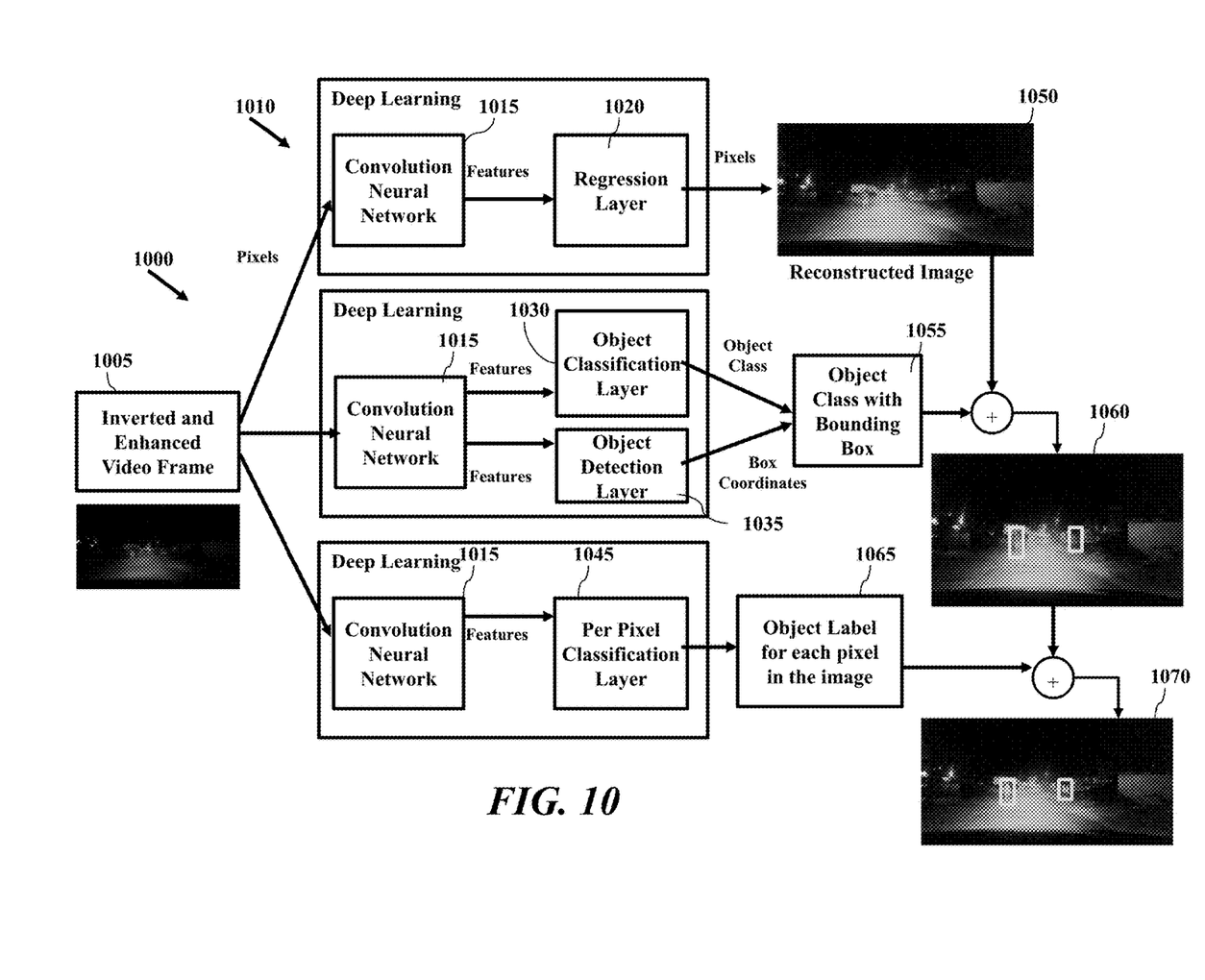
FIG. 10 depicts a flow diagram of deep learning according to one or more embodiments.

FIG. 10 depicts a flow diagram of deep learning according to one or more embodiments. Process 1000 may relate to operation of a deep learning module according to one or more embodiments. Process 1000 may be initiated by receiving inverted and enhance video frames at block 1005. Exemplary operations or functions of a deep learning module are shown generally as 1010, wherein the deep learning module can provide different functions and stages of processing image data.

According to one embodiment, the deep learning modules include a convolution neural network 1015 including multiple layers which process portions of inverted and enhance video frame 1005. Convolution neural network 1015 is configured to analyze image frames and perform machine learning of image content including pixel comparison, and frame overlap learning protocols to distinguish objects. Convolution neural network 1015 may be configured to till outputs of collections of images so that input regions overlap. The collections of images may be employed to generate a regression layer 1020. A better representation of the original image may then be generated for the inverted and enhanced video frame 1005 as reconstructed image 1050. Using a regression layer, the deep learning module can improve quality of video frames to better identify objects and portions of the image to be indicated in a diver assistance system, such as a roadway.

According to another embodiment, a deep learning module can display graphical elements as an indication of objects and their position. In one embodiment, deep learning module presents a rectangular outline or bounding box for detected objects. Convolution neural network 1015 may be configured to receive inverted and enhance video frame 1005 and identify features within the frames. Object classification layer 1030 detects and classifies objects according to one or more object types, such as objects to present, objects to ignore, etc. Object detection layer 1035 generates the display attributes and location for graphical elements to signify and/or highlight detected objects. According to one embodiment, object classification layer 1030 outputs detected object classes, and object detection layer 1030 outputs display element coordinates (e.g., box coordinates) to object class with bounding box module 1055. The bounding boxes are then added to reconstructed image 1050 to form image 1060 with bounding boxes (e.g., colored boxes, graphical elements, etc.) to indicate detected objects.

According to another embodiment, a deep learning module can modify pixel attributes of an image to provide colorization for detected objects. For example, the detected object can appear to be painted in a display of the driver assist system in a color or pattern, such as a bright color (e.g., yellow, green, etc.). Colorization may assist to provide a general silhouette and movement pattern of detected objects. Convolution neural network 1015 may be configured to receive inverted and enhance video frame 1005 and generate object features within the frames. Per pixel classification layer 1045 may be configured to output pixels classified with detected objects. At block 1065, each pixel within the image can be labeled. In certain embodiments labeling includes adding colorization to pixels labeled as being associated with a detected object. The colorization is then added to image 1060 to form image 1070 with yellow bounding boxes and colorized pixels to indicate detected objects.

While this disclosure has been particularly shown and described with references to exemplary embodiments thereof, it will be understood by those skilled in the art that various changes in form and details may be made therein without departing from the scope of the claimed embodiments.

What is claimed is:

1. A method for image presentation by a vehicle driver assist module, the method comprising:
    receiving, by a driver assist module, image data representing an outside of a vehicle;
    inverting, by the driver assist module, the image data to form inverted image data;
    running, by the driver assist module, a dehazing operation on inverted image data to generate enhanced inverted image data of the outside of the vehicle, wherein the dehazing operation is based on scene radiance, medium transmission and atmospheric light of the image data;
    inverting, by the driver assist module, the enhanced inverted image data to generate enhanced image data;
    generating, by the driver assist module, reconstructed image data from the enhanced image data, wherein the reconstructed image data is generated by
        performing a sparse representation of the enhanced image data for denoising of the enhanced image data, and
        performing a learning operation to identify and enhance objects of interest in the enhanced image data with the sparse representation; and
    outputting, by the driver assist module, the reconstructed image data to a display unit of the vehicle.

2. The method of claim 1, wherein the image data representing an outside of a vehicle includes video data captured by a front facing camera of the vehicle.

3. The method of claim 1, wherein the image data representing an outside of a vehicle includes image data captured by a wearable device associated with an operator of the vehicle.

4. The method of claim 1, wherein inverting includes pixel-wise inversion of entire frames of the image data.

5. The method of claim 1, wherein the dehazing operation includes determining scene radiance for the inverted video data based on an adjustment parameter to the medium transmission.

6. The method of claim 1, wherein the sparse representation of the enhanced image data utilizes existing, or infers, a combination of basic elements for frames of the image data forming a dictionary of atoms to change noise level for basic elements of the frame.

7. The method of claim 1, wherein performing a learning operation to identify and enhance objects of interest in the enhanced image data with the sparse representation includes identification of objects in frames, comparison and adjustment of objects in frames, and selection of one or more objects to identify in frames of the image data.

8. The method of claim 1, wherein the sparse representation and the learning operation are performed based on comparison of a daylight image associated with the image data using position of the vehicle.

9. The method of claim 1, wherein generating reconstructed image data based on the enhanced image data includes stitching denoised image data from the sparse representation with objects identified by the learning module.

10. The method of claim 1, wherein outputting the reconstructed image data includes superimposing outline elements associated with objects identified for the reconstructed image data.

11. A vehicle driver assist module comprising:
    an input module to receive image data representing an outside of a vehicle;
    an output module; and
    an image enhancer module coupled to the input module and output module, the image enhancer module including a processor configured to
    invert the image data to form inverted image data;
    run a dehazing operation on inverted image data to generate enhanced inverted image data of the outside of the vehicle, wherein the dehazing operation is based on scene radiance, medium transmission and atmospheric light of the image data;
    invert the enhanced inverted image data to generate enhanced image data;

generate reconstructed image data from the enhanced image data, wherein the reconstructed image data is generated by performing a sparse representation of the enhanced image data for denoising of the enhanced image data, and performing a learning operation to identify and enhance objects of interest in the enhanced image data with the sparse representation; and control the output module to output the reconstructed image data to a display unit of the vehicle.

12. The device of claim 11, wherein the image data representing an outside of a vehicle includes video data captured by a front facing camera of the vehicle.

13. The device of claim 11, wherein the image data representing an outside of a vehicle includes image data captured by a wearable device associated with an operator of the vehicle.

14. The device of claim 11, wherein inverting includes pixel-wise inversion of entire frames of the image data.

15. The device of claim 11, wherein the dehazing operation includes determining scene radiance for the inverted video data based on an adjustment parameter to the medium transmission.

16. The device of claim 11, wherein the sparse representation of the enhanced image data utilizes existing, or infers, a combination of basic elements for frames of the image data forming a dictionary of atoms to change noise level for basic elements of the frame.

17. The device of claim 11, wherein performing a learning operation to identify and enhance objects of interest in the enhanced image data with the sparse representation includes identification of objects in frames, comparison and adjustment of objects in frames, and selection of one or more objects to identify in frames of the image data.

18. The device of claim 11, wherein the sparse representation and the learning operation are performed based on comparison of a daylight image associated with the image data using position of the vehicle.

19. The device of claim 11, wherein generating reconstructed image data based on the enhanced image data includes stitching denoised image data from the sparse representation with objects identified by the learning module.

20. The device of claim 11, wherein outputting the reconstructed image data includes superimposing outline elements associated with objects identified for the reconstructed image data.

* * * * *